Figure 1:
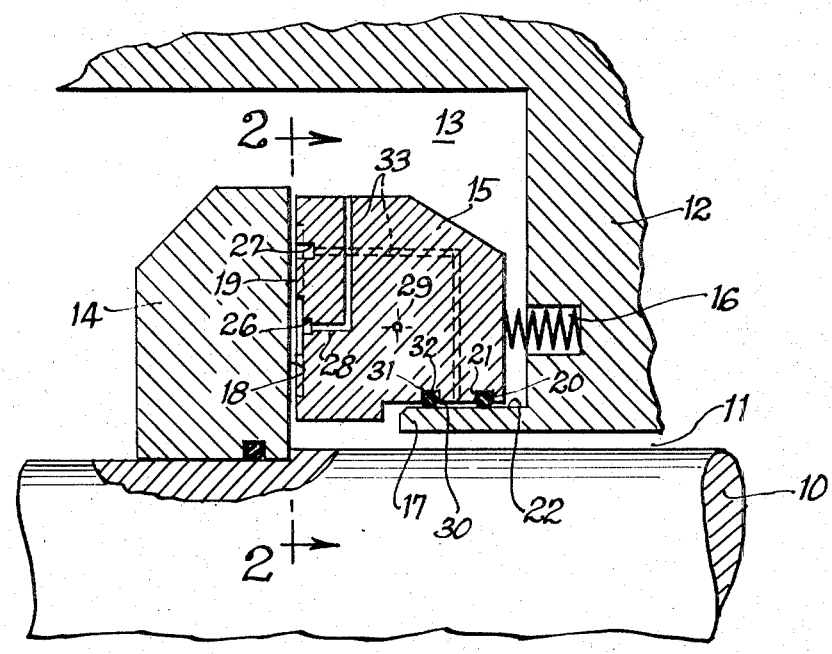

United States Patent [19]
Gardner

[11] 3,804,424
[45] Apr. 16, 1974

[54] GAP SEAL WITH THERMAL AND PRESSURE DISTORTION COMPENSATION

[75] Inventor: James F. Gardner, Chicago, Ill.

[73] Assignee: Crane Packing Company, Morton Grove, Ill.

[22] Filed: Apr. 24, 1972

[21] Appl. No.: 246,823

[52] U.S. Cl............................ 277/27, 277/74, 277/96
[51] Int. Cl............................................. F16j 15/34
[58] Field of Search................. 277/3, 27, 74, 75, 96

[56] References Cited
UNITED STATES PATENTS
3,410,565  11/1968  Williams ................................. 277/3
3,675,935   7/1972  Ludwig ................................. 277/27

Primary Examiner—Samuel B. Rothberg
Attorney, Agent, or Firm—Charles F. Voytech

[57] ABSTRACT

The disclosure is of a rotary mechanical seal of the gap type, particularly for large diameter shafts, which is designed to reduce or eliminate entirely distortions in the sealing washer thereof caused by thermal expansion of the washer or by a change in the pressure profile across the sealing face of the washer. Thermal deflection is counteracted by providing a chamber on a cylindrical section behind the sealing washer face, and subjecting the chamber to the pressure existing between the opposing faces of the seal. Shallow spiral grooves formed in one of the opposing faces and directed to produce a pressure across the faces in opposition to the normal pressure gradient thereacross serve to provide a variety of pressures one of which is tapped as the source of pressure for the chamber.

4 Claims, 2 Drawing Figures

PATENTED APR 16 1974  3,804,424

GAP SEAL WITH THERMAL AND PRESSURE DISTORTION COMPENSATION

This invention relates to rotary mechanical seals of the gap type.

A rotary mechanical seal has been proposed wherein shallow spiral grooves are etched into one of the radial sealing faces of the seal to provide a pumping action by which the faces are separated during operation to minimize wear. (Transactions of the ASME Paper No. 67-WA/Lub-17) In the proposed seal, the spiral grooves pump fluid from between the faces toward the high pressure side of the faces. To provide zero leakage at standstill, a pressure balance (spring force plus fluid pressure) is selected to provide a force that tends to close the seal. The spiral grooves are divided radially by a deep circular groove formed in the seal face. Fluid from the pressure side of the seal is fed to the deep circular groove by holes drilled in the deep groove and leading into the pressure side of the seal so that the pressure at the deep groove is approximately the same as at the pressure side of the seal. A continuous land or dam is left at the ends of the grooves at the pressure side. The direction of the spiral grooves is such that one half of each of the grooves tends to separate the faces against the spring and fluid pressure and the other half draws fluid from the low pressure side of the seal to give an overall no-leak operation.

If in the foregoing seal the pressure of the fluid sealed is raised to what would be considered high pressure in the seal art, the heat generated in the spiral grooves by the continuous shearing of the fluid would cause the sealing washer to become hot at the sealing face and subject to thermal distortion. The portion of the washer axially removed from the face is cooled by the fluid being sealed and hence an axial temperature gradient is formed in the washer with the hottest part tending to expand radially more than the cooler part. This causes the thermal distortion to take the form of a rotation of the washer radial section about its centroid away from the mating seal face thus bringing the radially inner edge of the sealing face closer to its mating face and tending to close the gap between them. If the gap is completely closed, contact between the seal faces results and wear increases rapidly.

Distortion in one of the seal faces can be created by the uneven forces of expansion existing axially across the washer due to the increase in temperature of the washer at its faces as the seal operates. The liquid between the faces is in shear and the continued operation of the seal causes heat to be generated in both the liquid and in the adjacent seal faces on both sides of the liquid. There is thus created a thermal gradient axially across the seal washer and cooperating seal element. Although the co-operating seal element will be distorted, for purposes of seal design, this distortion can be added to that of the washer. With the face portion of the washer expanding more than the side opposite the face portion, a turning moment is created in the washer about the centroid of a radial section of the washer which brings the radially inner edge of the washer closer to the cooperating seal element than the outer edge. The gap-producing pressure balance across the washer is destroyed and the washer contacts the co-operating seal element to wear rapidly.

The principal object of this invention is to provide a gap-type seal in which means are provided to counteract distortive pressure and thermal forces to maintain a desired gap between the faces of a rotary mechanical seal over a large pressure range.

As a more specific object, this invention seeks to provide a gap-type rotary mechanical seal in which a pressure chamber is formed on one side of the centroid of the radial section of the sealing washer of said seal to provide a turning moment for the section which acts in opposition to the thermal distortive force on the washer to maintain the original flatness of the face of the washer.

Figure 2:
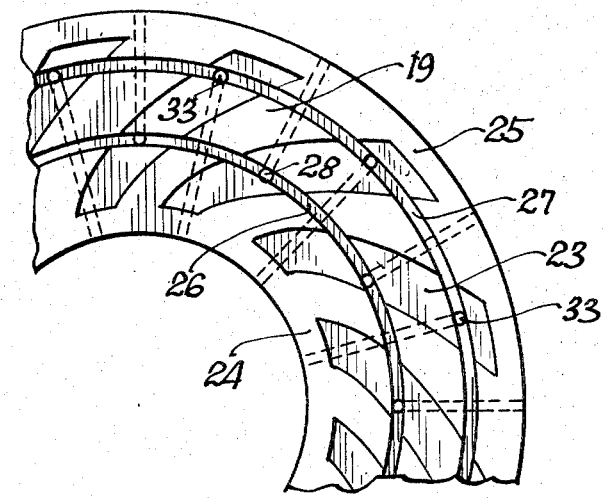

These and other objects of this invention will become apparent from the following detailed description of a preferred embodiment thereof when taken together with the accompanying drawing in which:

FIG. 1 is a side elevation in section of a gap-type seal incorporating this invention; and FIG. 2 is a fragmentary front elevational view of the sealing washer of FIG. 1.

In the gap seal chosen to illustrate this invention, shallow spiral grooves are formed in the face of the seal washer to pump liquid from the low pressure side of the washer to the high pressure side. This develops a zone of high pressure near the pressure side of the washer. An axially extending support for the washer provides one wall of a chamber under the washer, a pair of spaced packing members form opposed side walls and the washer itself forms the fourth wall of said chamber. Passages are drilled from the high pressure zone to the chamber to produce a radial force on the washer acting upwardly. The chamber is disposed on the side of the centroid of the washer section at which the pressure of the fluid in the chamber establishes a moment about the centroid in operation to the thermal moment and thus prevents the distortion caused thereby.

Referring now to the drawings for a more detailed description of the invention, there is shown in FIG. 1 a shaft 10 passing through an opening 11 in a housing 12 of a pump or the like defining a seal chamber 13 containing liquid under pressure.

Opening 11 is closed off by a rotary mechanical seal of the gap type comprising a rotating seat or rotor 14, a stationary sealing washer or stator 15 and a series of springs 16 acting upon washer 15 to urge it against seat 14. An axially extending flange 17 on housing 12 in proximity to shaft 10 provides a support for washer 15 on which the washer is axially movable to take up for wear and in response to gap-forming forces.

The confronting radially disposed faces 18 and 19 on seat 14 and washer 15, respectively, are lapped perfectly flat and smooth so that when shaft 10 is not rotating a series of springs 16 will hold washer face 19 against seat face 18 to prevent leakage of fluid therebetween. A seal is formed between washer 15 and flange 17 by packing which may take the form of an O ring 20 disposed in an internal groove 21 in washer 15 and extending out of said groove 21 into contact with the cylindrical outer surface 22 on flange 17.

It is contemplated that under operating conditions, faces 18 and 19 will be separated and held apart by fluid pressure developed between the top half of said faces as a function of the rotation of shaft 10 so that wear and frictional drag will be held to a minimum. Said fluid pressure is developed by a plurality of shallow spiral grooves 23 (FIG. 2) in one of the faces 18, 19, preferably in face 19. In the present invention, however, the grooves terminate in inner and outer lands 24 and 25, respectively. Two circular grooves 26 and 27 are provided in the seal face 19, groove 26 being vented or connected to chamber 13 and thus to system pressure by a number of orifices 28.

In operation, the seal is initially pressure balanced at zero r.p.m. so that no gap exists between faces 18 and 19. As rotation begins, spiral grooves 23 begin to pump fluid entrained between the faces outwardly against the pressure in chamber 13. This decreases the pressure drop across the bottom land 24 and hence decreases seal leakage. As the speed of rotation increases, the pressure drop across land 24 becomes zero, and the seal operates in a non-leaking mode.

The purpose of the outer land 25 is to compensate for the decrease in opening force on the inner half of the seal faces. The top half of the spiral groove creates an additional force and is designed to balance the decrease in opening force on the inner half of the faces 18, 19 as the speed of rotation increases. An increase in speed beyond that at which a zero pressure drop is created across the inner land 24 will result in an increase in net opening force and therefore the same pressure distribution across the faces 18, 19 will be maintained, but at a larger operating gap between faces 18, 19.

The centroid of the sealing washer radial section is shown at 29. With the seal operating as thus far described, the net moment of forces acting upon washer 15 about centroid 29 changes as rotation begins. Although the axial force is relatively constant, the net moment of forces increases in a clockwise direction about centroid 29 as viewed in FIG. 1. To counteract this increased clockwise moment, a pressure chamber 30 is formed between washer 15 and cylindrical surface 22 on flange 17. Said chamber is sealed on one side by O-ring 20 and on its opposite side by a similar O-ring 31, compressed in a groove 32. Groove 27 in face 19 of washer 15 is connected to chamber 30 by drilled orifices 33 so that chamber 30 is at the same pressure as groove 27. The distance between the O-rings 20 and 31, their location relative to centroid 29, and the radial location of the orifices 33 are chosen to maintain zero moment as close as possible during all operating conditions.

With chamber 30 connected to groove 27, as pressure builds up in groove 27 with speed, pressure will likewise build up in chamber 30, and since both pressures are on the same side of centroid 29, the chamber pressure will counteract both the hydrodynamic pressure of the spiral grooves 23 and the force produced from the thermal distortion of the washer 15. The latter force is derived from the power loss due to the shear of the fluid, and this force is likewise a function of the speed of rotation of seat washer 14 so that it increases with increase in speed. The chamber pressure, or negative moment can be controlled by selecting the appropriate radial position at which the high pressure spiral groove section is tapped and also by selecting the appropriate location and axial dimension of the pressure chamber itself.

Thus with an appropriate selection of the axial dimension and location of the chamber 30 any thermal coning of washer 15 will be resisted by the pressure of the liquid in chamber 30. If said chamber 30 is made oversized, it can be made to counteract any tendency toward coning resulting from a change in the location of the center of pressure of the liquid between faces 18 and 19 resulting from changes in the speed of the rotating seat as well as resulting from an axial temperature gradient in the washer.

I claim:
1. In combination, a housing defining a chamber for the reception of a fluid under pressure, a shaft in the chamber, said housing having an opening through which said shaft extends to the exterior of the housing, and a rotary mechanical seal for effecting a seal between the shaft and housing, said seal comprising a sealing washer fixed to and rotatable with the shaft, a non-rotatable sealing washer adjacent the rotatable sealing washer, said rotatable and non-rotatable sealing washers having opposed radially extending sealing faces, said non-rotatable washer being subject under operating conditions to thermal coning such that the radially inner portion of its sealing face is closer to the sealing face of the rotating washer than is the radially outer portion of its sealing face, an axially disposed support for the non-rotatable sealing washer, and means establishing a pressure chamber between the support and non-rotatable sealing washer acting in opposition to the thermal coning of said non-rotating washer resulting from heat generated between said faces by the relative rotation thereof.

2. The combination defined in claim 1, said means establishing a pressure chamber comprising spaced sealing means between the non-rotatable washer and the axially disposed support therefor, fluid means for producing a gap between said faces, and means for conducting fluid under pressure from between said faces to said pressure chamber, said non-rotatable washer being subjected to an axially increasing temperature gradient in the direction of said faces tending to distort the washer by turning it about its centroid in its radial cross section in one direction of rotation about said centroid and said fluid under pressure in said pressure chamber acting upon said washer eccentrically of said centroid to rotate said washer about its centroid in the opposite direction, whereby to minimize said thermal coning of said washer under operating conditions.

3. The combination defined in claim 2, said means for producing a gap between said faces comprising a plurality of shallow spiral grooves formed in one of said faces and of an angularity with respect to a radius on said one of said faces to pump fluid toward the first said chamber for the reception of fluid under pressure and thereby create a pressure between said faces tending to separate said faces, and said means for conducting fluid under pressure from between said faces to said pressure chamber comprising orifices in said one of said faces at the radial location of said pressure between said faces tending to separate said faces, said shallow spiral grooves establishing a decreasing pressure gradient from the chamber for the reception of fluid under pressure to the atmospheric side of said non-rotatable washer face which varies in form and magnitude in accordance with the relative speed of rotation of said faces, and means for introducing fluid under pressure from between said faces to said pressure chamber at a point between said faces at which the pressure is greater than the pressure in the first said chamber.

4. The combination defined in claim 2, said axially disposed support for the non-rotatable sealing washer comprising a cylindrical extension on the housing, said non-rotatable sealing washer encircling said extension, and said spaced sealing means comprising a pair of O-rings compressed between said non-rotatable sealing washer and said extension.

* * * * *

PO-1050
(5/69)

UNITED STATES PATENT OFFICE
CERTIFICATE OF CORRECTION

Patent No. 3,804,424            Dated April 16, 1974

Inventor(s)  James F. Gardner

It is certified that error appears in the above-identified patent and that said Letters Patent are hereby corrected as shown below:

Col. 2, line 34, "operation" should be
--opposition--.

Signed and sealed this 10th day of September 1974.

(SEAL)
Attest:

McCOY M. GIBSON, JR.            C. MARSHALL DANN
Attesting Officer               Commissioner of Patents